United States Patent [19]

Francois

[11] Patent Number: 5,344,101

[45] Date of Patent: Sep. 6, 1994

[54] SAFEGUARD SYSTEM OF A SPEED INCREASING/REDUCING MECHANICAL ASSEMBLY, ESPECIALLY OF THE HELICOPTER "GEAR BOX" TYPE, IN CASE OF LUBRICATING OIL LOSS

[75] Inventor: Roland C. Francois, Cabries, France

[73] Assignee: Aerospatiale Societe Nationale Industrielle, Paris, France

[21] Appl. No.: 966,750

[22] Filed: Oct. 27, 1992

[30] Foreign Application Priority Data

Oct. 30, 1991 [FR] France .................................. 91 13439

[51] Int. Cl.$^5$ ............................................. B64C 27/12
[52] U.S. Cl. .................................. 244/17.11; 60/39.08; 184/6.11; 74/467; 74/606 A; 244/60
[58] Field of Search ................ 244/17.11, 60; 184/6.4, 184/6.11, 6.12; 60/39.08; 74/467, 606 A

[56] References Cited

U.S. PATENT DOCUMENTS

| | | | |
|---|---|---|---|
| 4,284,174 | 8/1981 | Salavana et al. | 184/6.4 |
| 4,717,000 | 1/1988 | Waddington et al. | 184/6.11 |
| 4,852,693 | 8/1989 | Nakajima et al. | 184/6.4 |
| 4,888,947 | 12/1989 | Thompson | 184/6.11 |
| 4,891,934 | 1/1990 | Huelster | 184/6.11 |
| 5,046,306 | 9/1991 | Borre, Jr. | 184/6.11 |
| 5,097,926 | 3/1992 | Duello | 184/6.11 |
| 5,189,929 | 3/1993 | Chory | 74/606 A |
| 5,193,645 | 3/1993 | Francois | 74/606 A |

FOREIGN PATENT DOCUMENTS

WO91/05943 5/1991 PCT Int'l Appl. .

Primary Examiner—Galen L. Barefoot
Attorney, Agent, or Firm—Nikaido, Marmelstein, Murray & Oram

[57] ABSTRACT

The invention relates to a safeguard system for speed increasing/reducing mechanical assembly, especially of the helicopter "gear box" type, in case of lubricating oil loss, which comprises an additional cooling system the casing of the said mechanical assembly, with an inlet (1) and an outlet (2) arranged on the casing (3) of this mechanical assembly. The inlet (1) and the outlet (2) closed during normal operation and they open under the effect of a control device at a preset value of a parameter significant for lubricating oil loss, whereby this control device actuates simultaneously the additional cooling system, in order to provide a circulation of the coolant between the inlet (1) and the outlet (2) so that this coolant, loaded with the calories further to the warm-up caused by the lubricating oil loss, may evacuate the said calories outside via the outlet (2) of the additional cooling system, which is of the air circulation type.

18 Claims, 5 Drawing Sheets

SAFEGUARD SYSTEM OF A SPEED INCREASING/REDUCING MECHANICAL ASSEMBLY, ESPECIALLY OF THE HELICOPTER "GEAR BOX" TYPE, IN CASE OF LUBRICATING OIL LOSS

BACKGROUND OF THE INVENTION

The present invention relates to a safeguard system for a speed increasing/reducing mechanical assembly in case of lubricating oil loss and can be applied to a helicopter main, intermediate or rear gear box, especially to a military helicopter.

In speed increasing/reducing mechanical assemblies, the lubricating oil performs two functions: reducing the friction at the gears and bearings and evacuating the power losses in the form of heat. In the case of a main gear box in a helicopter, exhausting the oil-carried heat unfurls usually under pressure inside an oil/air exchanger whereas, in the case of an "auxiliary gear box"-type low power box, oil transmits heat to the inner walls of the box casing by running and conduction and the outer wall of this casing transmits heat by open-air convection.

In case of oil loss in the lubricating system, the friction coefficients of the various mechanical parts increase considerably and, consequently, the portion of energy lost in the form of heat becomes important with respect to the mechanical power transmitted to the helicopter rotor. Moreover, thermal energy is practically not evacuated any longer, hence rapid temperature increase in the gears and bearings. Therefore, the materials undergo metallurgical transformations and their mechanical performances collapse, causing the loss of torque transmission consecutively to the destruction of a roller or a tooth or both these elements.

It is in case of oil loss in a gear box, and especially the main gear box, the helicopter is forced to land a few moments after the breakdown because of the rapid destruction of the internal supports, whereas shortly no more power will be transmitted to the rotor. This oil loss may have very serious consequences when flying over a hostile zone: sea, forest, urban train station, enemy territory, a helicopter forced then to land or alight on water in hazardous, let alone catastrophic, conditions.

SUMMARY OF THE INVENTION

The purpose of the present invention is to provide a safeguard system for speed increasing/reducing mechanical assembly, enabling to prolong the operating time of these mechanical assemblies once they have lost their lubricating oil, while keeping the architecture of these mechanical assemblies integrally, such as the main gear boxes or the rear gear boxes of helicopters, especially military helicopters.

According to the invention, the safeguard system of a speed increasing/reducing mechanical assembly, especially of helicopter "gear box" type, in case of lubricating oil loss, comprises an additional cooling system for the housing of the said mechanical assembly, with an inlet and an outlet located on the casing of this mechanical assembly. The inlet and the outlet are closed during normal operation and they open when energized by a control device according to a preset value of a parameter significant for the lubricating oil loss. The control device turns on simultaneously the additional cooling system, so as to provide a circulation of the coolant between the inlet and the outlet, so that this coolant, loaded with the calories further to the warm-up caused by the lubricating oil loss, may evacuate to the outside the said calories using the outlet of the additional cooling system.

Preferably, the additional cooling system of the gear box housing consists in an additional air circulation system, comprising a fresh air inlet duct fitted with a valve, which is closed in normal operation. The control device actuates, at the threshold of the preset value of the parameter significant for the lubricating oil loss, the valve in order to open it and maintain it opened throughout the operation of the additional cooling system, whereas the outlet valve opens under the effect of internal pressure. The control device is a manual or automatic control device. In case when the control device is an automatic control device, it can be based on the measurement of a parameter significant for the oil loss or the measurement of a significant zone of abnormal warm-up of the mechanism. The safeguard system, according to the invention, can be applied, for instance, to a gear box containing a conical torque inlet and an epicyclic gear train outlet. In this structure, the air intake is located in the area of the movement input conical torque ring and the air exhaust is located in the area of the motion output epicycloidal gear. The fresh air inlet duct is connected directly to the outside and contains a branch piping upstream of the valve, enabling a dynamic air tapping. In order to improve the efficiency of the safeguard system according to the invention, the air inlet duct may include an electric fan which is mounted immediately upstream of the valve, i.e. between this valve and the branch piping. The safeguard system according to the invention may also be applied in another structure where the gear box only contains a conical torque device. With this configuration, the inlet of the air intake is located in the area of the motion input conical torque ring and the outlet is located at the other end, axially.

According to an alternative embodiment of the invention, which relates to the same structure with an inlet conical torque device and an outlet epicyclic train, the air inlet duct is connected to the propeller turbine compressor of the aircraft.

According to another alternative embodiment of the invention, which relates to the same structure with an inlet conical torque device and an outlet epicyclic train, the additional cooling system comprises an additional emergency lubricating system using a liquid or solid lubricant. With this alternative embodiment, the additional emergency lubricating system contains a lubricant tank, located outside the gear box and connected to the former by a feeding pipe, leading immediately downstream of the fresh air inlet duct valve, whereas the extremity of this duct has a Venturi configuration approximately in the centre of the inlet duct.

The safeguard system of a speed increasing/reducing mechanical assembly, according to the invention which applies especially to helicopter gear boxes in case of lubricating oil loss, advantageously prolongs the operating time of these speed increasing/reducing assemblies or these gear boxes once they have lost their lubricating oil. The safeguard system according to the invention also advantageously improves the survivability of helicopter gear boxes, while ensuring the evacuating of the heat generated inside this box, in the absence of oil, by circulating compressed air. This possibility offered by the invention is particularly useful in the case of military helicopters where it may ensure the survival of the aircraft flying over a hostile zone. Other advantages of the invention, will be better understood using the description hereunder of particular embodiments, the list being non-exhaustive, with reference to the drawings enclosed:

DETAILED DESCRIPTION OF THE INVENTION.

Figure 2:
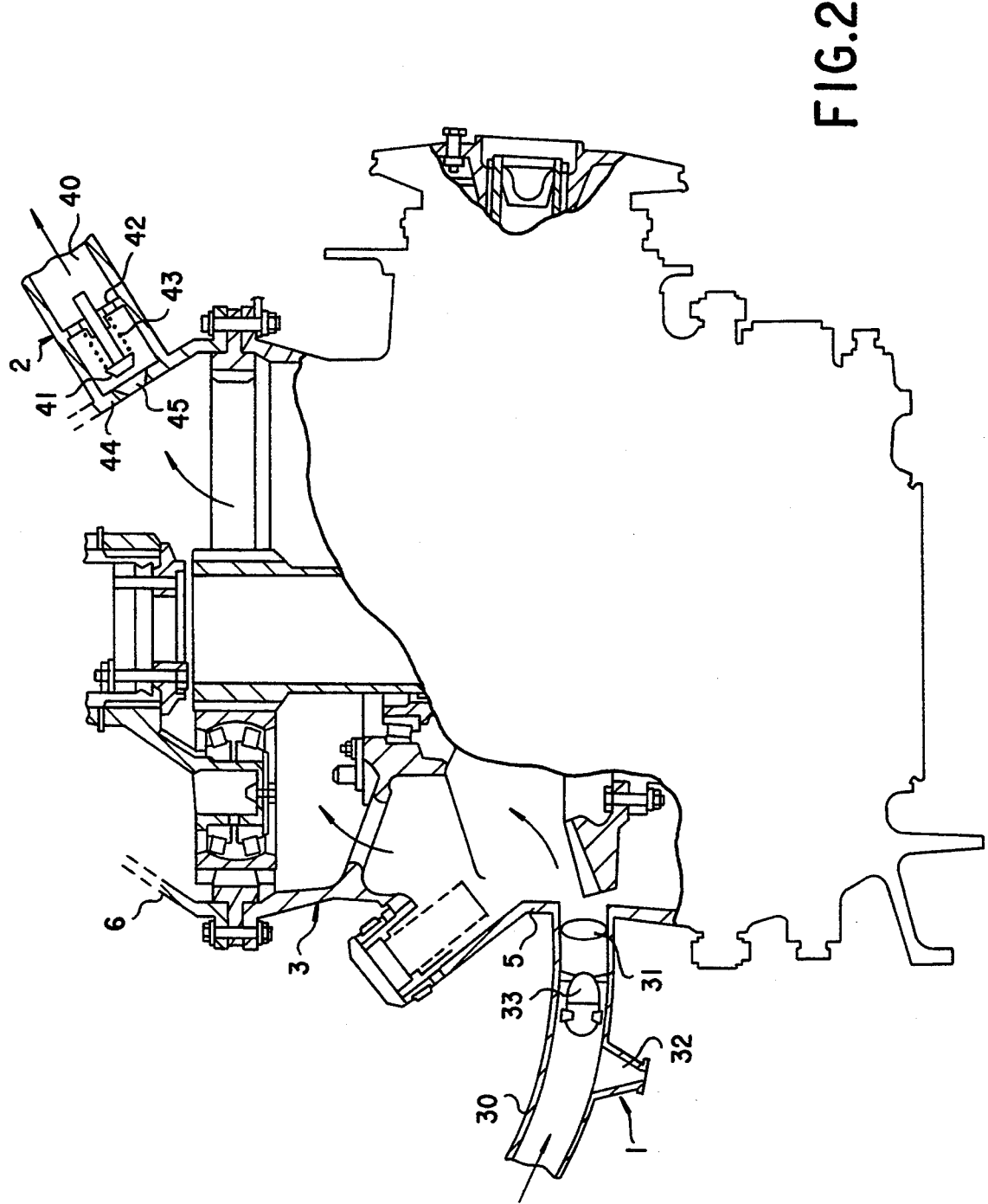
FIG. 2 is a partial axial view of a helicopter main gear box assembly similar to FIG. 1, with another embodiment of the invention.
Figure 3:
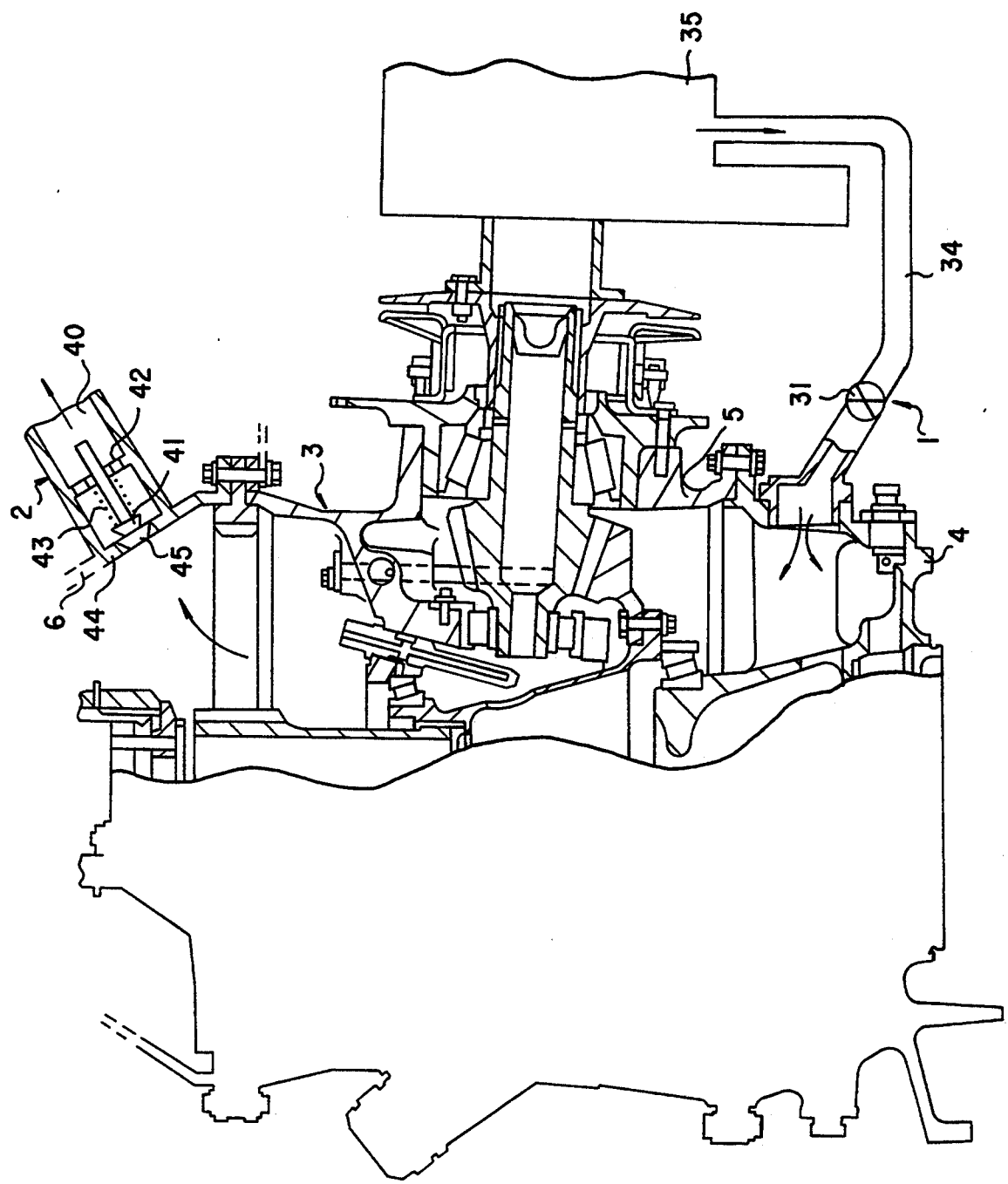
FIG. 3 is a partial axial view of a helicopter main gear box assembly similar to FIG. 1, with another embodiment of the invention.
Figure 4:
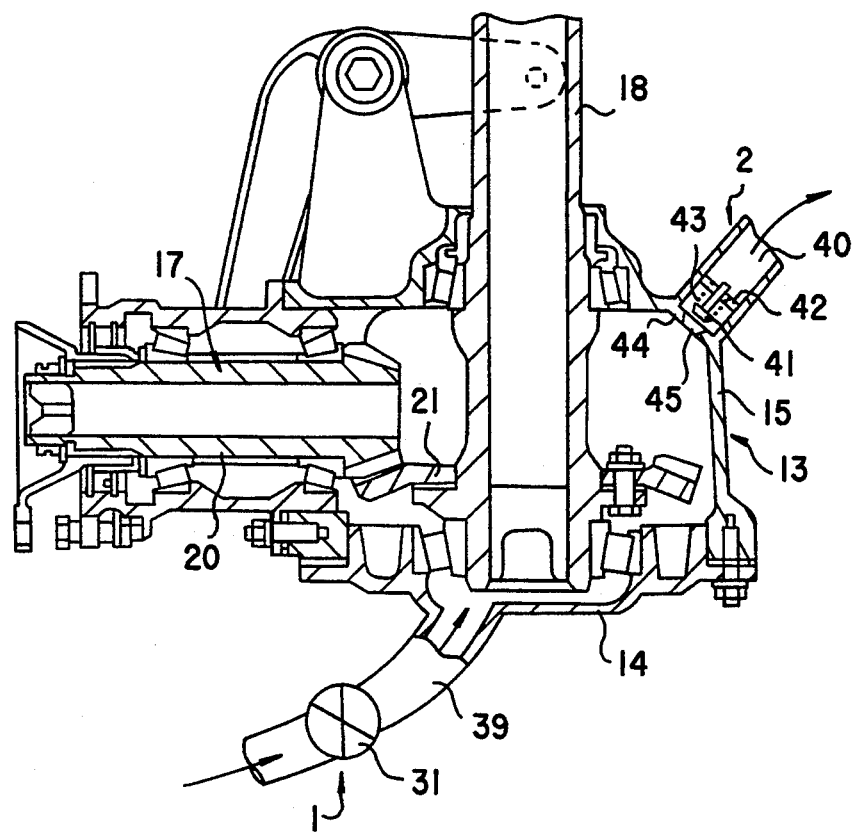
FIG. 4 is an axial view of a helicopter rear gear box containing a safeguard system in case of lubricating oil loss according to the invention.

The safeguard system, according to the invention, relates to a mechanical assembly which can be a speed increasing/reducing assembly and it applies more especially to helicopter gear boxes, i.e. main gear boxes, as the one represented on FIGS. 1, 2, 3 and 5 and the rear gear boxes, as the one represented on FIG. 4. This safeguard system contains mainly an additional cooling system according to the invention with an inlet, referenced as 1 on all figures and an outlet, referenced as 2 on all figures, which are located on the casing of this mechanical assembly. Inlet 1 and outlet 2 are closed during normal operation and they open under the effect of a control device at a preset value of a parameter significant for the lubricating oil loss. The control device then sets in motion simultaneously the additional cooling system, so as to provide a circulation of the coolant between inlet 1 and outlet 2 so that this coolant, loaded with the calories further to the warm-up caused by the lubricating oil loss, may evacuate the calories to the outside using the outlet of the additional cooling system.

According to the various embodiments of the invention, the additional cooling system on the gear box housing comprises an additional air circulation system. For all these embodiments represented, the control device may be a manual control device or an automatic control device. In the latter case, i.e. in the case of the automatic control device, it can be a control device based on the measurement of the parameter significant for the oil loss or the automatic control device may be based upon the measurement of the parameter significant for the oil temperature of a significant zone of abnormal warm-up of the mechanism.

Figure 1:
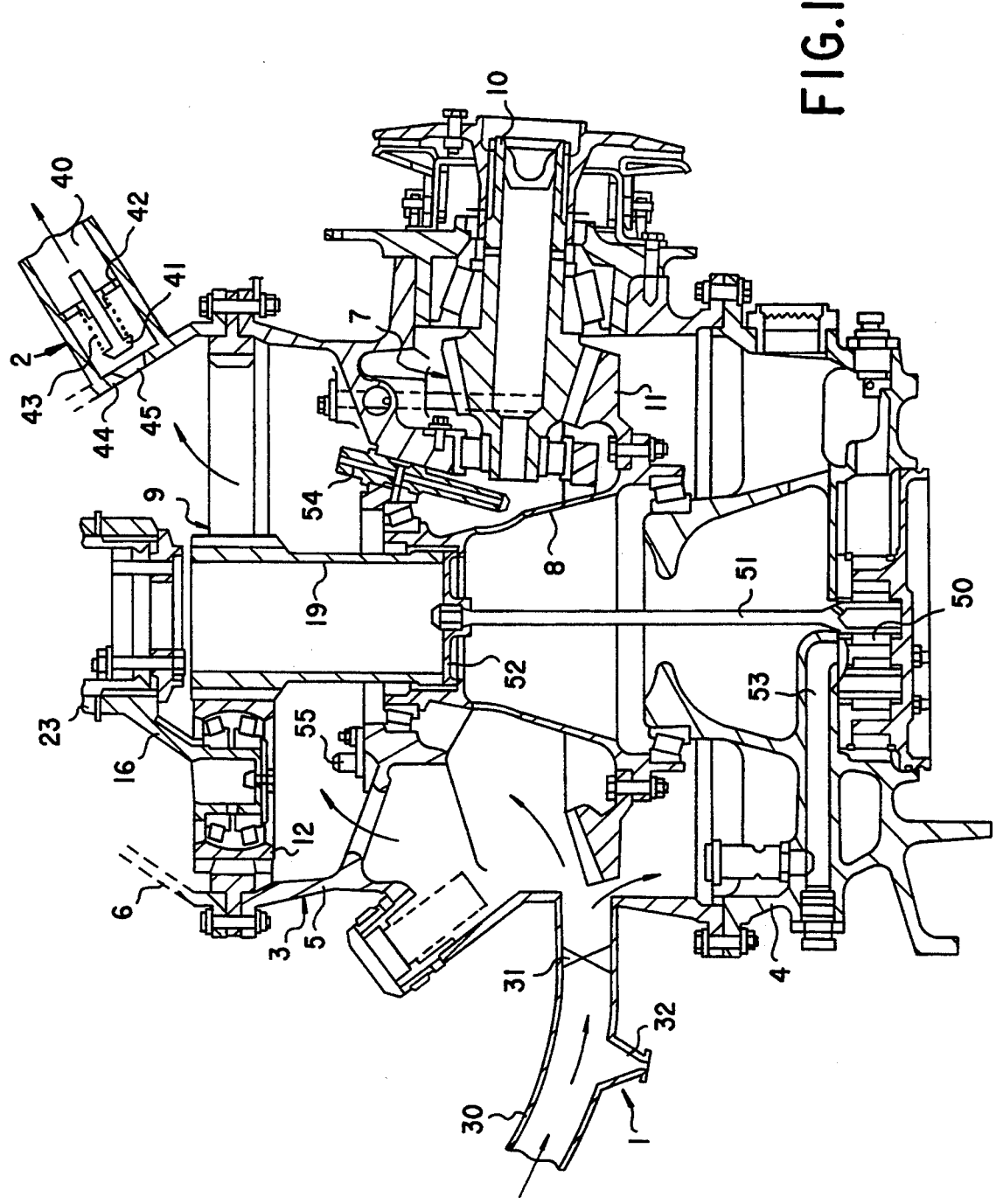
FIG. 1 is an axial view of a helicopter main gear box assembly with a safeguard system in case of lubricating oil loss according to the invention.

FIG. 1 represents a helicopter gear box made up of a conical torque device 7 receiving the motion input and an epicyclic train 9 producing the motion output. A vertical shaft 8 transmits the motion between the motion input conical torque device 7 and the motion output epicyclic train 9. This gear box assembly is located in a casing 3.

According to the architecture represented on FIG. 1, the casing 3 is made up itself of three casings: a lower casing 4, a main casing 5 and an upper casing 6. The lower casing 4 is mounted on the main casing 5 and it is attached thereon by a bolt set. In the same way, the upper casing 6 is also mounted on the main casing 5, onto which it is attached by a bolt set.

The motion input conical torque device 7 is made up of a conic gear 10 and a vertical axis conical ring 11. The conical gear 10 is mounted on the main casing 5 via bearings, whereas the conical ring 11 is mounted on the vertical shaft 8, which is mounted itself at its lower extremity on the lower casing 4 and at its upper extremity on the main casing 5 via bearings.

The epicyclic train 9 is made up of a sun gear 19, a ring 22, planet gears 12 and a planet wheel carrier 16. The motion input is performed by the sun gear 19 which is rotatively integral with the vertical shaft 8. The ring 22 is stationnary and mounted between the main casing 5 and the upper casing 6 by means of fastening bolts of both these casings. The planet gears 12 are mounted on the planet wheel carrier 16 by means of bearings. The motion output is performed by the planet wheel carrier 16 which is integral with the rotor shaft 23.

The gear box lubricating system, represented on FIG. 1, is a pressurized system with an oil pump 50, an air/oil radiator type heat exchanger and nozzles 54 and 55 which spray the various gears and bearings. The oil pump 0 is located in the lower casing 4 and rotation-driven by a gear 52 which is integral with the vertical shaft 8. This gear 52 is linked to the oil pump 50 by an oil pump shaft 1. The oil pump 50 sucks in oil into the bottom section of the lower casing 4 to send it into a ductwork 53 which is arranged in the lower casing 4. This ductwork 53 leads to an external circuit fitted with the air/oil exchanger so that oil flows back into the main gear box via the nozzles 54 and 55. Then, oil falls back to the bottom by gravity.

According to the embodiment represented on FIG. 1, the additional cooling system of the housing according to the invention comprises an inlet 1 for the air intake which is located in the area of the ring 11 of the motion input conical torque device 7 and the outlet for air exhaust is located in the area of the motion output epicycloidal train 9. The inlet 1 for air intake, from a dynamic tapping on the fuselage, is made of a fresh air inlet duct 30 arranged and located on the side of the main casing 5 in order to lead directly to the immediate vicinity of the motion input conical ring 11. A valve 31 is placed inside this inlet duct 30 and it is located just before the inlet into the main casing 5. This valve 31 is usually closed during normal operation of the main lubricating circuit. Moreover, the inlet duct 30 contains a branch duct 32 located upstream the valve 31 which enables draining the water which may have entered the inlet duct 30. The outlet 2 for air exhaust is made out of an outlet duct 40 located on the upper casing 6 above the ring 22 of the epicyclic train 9. The outlet duct 40 is fitted with a valve 41 with a spring 43 arranged between this valve 41 and a wall 42 arranged inside the air outlet duct 40. The valve 41 bears upon a seat 44 which defines an outlet hole 45.

In case of any incident in the lubricating system of the main gear box and when the threshold of the preset value of the parameter significant for lubricating oil loss has been reached, the control device acts upon the valve 31 in order to open it and maintain it opened throughout the operation of the additional cooling system. The outlet valve 41 opens up under the action of the internal pressure which pushes the valve 41 backward and releases it from its base 44. The control device according to the invention is a manual or automatic control device. In case when the control device is automatic, it can be based on the measurement of the parameter significant for the oil loss or upon the measurement of the temperature of a significant zone of abnormal warm-up of the mechanism.

The additional cooling system of the casing according to the invention, represented on FIG. 2, relates to a main gear box similar to that represented on FIG. 1. In the same way, the inlet 1 for air intake is located in the area of the ring 11 of the motion input conical torque device 7 and the outlet 2 for air exhaust is located in the area of the motion output epicycloidal train 9. The fresh air inlet 1 is made of an inlet duct 30 located on the main casing 5, which is fitted with the valve 31 closed in normal operation. The inlet duct 30 is connected directly to the outside and it comprises a water drainage branch piping 32 located upstream the valve 31. Moreover, the inlet duct 30 contains an electric fan 33 located just upstream of the valve 31, i.e. between the valve 31 and the branch piping 32.

The outlet 2 for air exhaust is located on the upper casing 6 above the epicycloidal train 9 in the same way as in FIG. 1. This outlet 2 is also made out of an outlet duct 40 leading directly into the casing 6 and has, as in the previous case, a valve 41 closed in normal operation. The valve 41 is pushed backward by the spring 43 applied to the wall 42 in order to bear upon the seat 44 in which the outlet hole 45 is fitted. Once the preset value threshold of the parameter significant for lubricating oil loss has been reached, the control device acts on the valve 31, in order to open it and to maintain it opened throughout the operation of the additional cooling system, whereas the air exhaust outlet valve 41 opens under the effect of the internal pressure. The outside air then penetrates the gear box and air pressure can be generated, either by the forward motion speed of the helicopter and a dynamic air tapping as in the case of FIG. 1 or using an electric fan 33 blowing into the gear box and actuated when the oil pressure drops for instance, or by a system which combines both previous solutions, i.e. the dynamic air tapping and the electric fan 33, as in the case represented in FIG. 2.

The additional cooling system of the casing, according to the invention, represented in FIG. 3, also relates to a main gear box with the same architecture as that of FIG. 1. In the same way, the inlet 1 for air intake is located in the area of the ring 11 of the motion input conical torque device 7 and the outlet 2 for air exhaust is located in the area of motion output epicycloidal train 9. In the case of the figure, the air inlet 1 contains a fresh air inlet duct 34 fitted with a valve 31 closed during normal operation. This air inlet duct 34 is connected to the compressor 35 of the aircraft propeller unit turbine. The inlet duct 34 leads to the lower casing 4 below the ring 11 of the motion input conical torque device 7. In the same way as in the previous cases, the outlet for air exhaust is made of an outlet duct 40 arranged on the upper casing 6 and fitted with a valve 41 closed in normal operation. The valve 41 has a constitution similar to the previous ones and it is fitted with a spring 43 bearing against the wall 42 so that the valve 41 closes the outlet hole 45 of the seat 44. This outlet valve 41 opens under the effect of internal pressure. The embodiment of the invention, represented in FIG. 4, relates to an auxiliary gear box or a rear gear box in which the casing is oil splash lubricated. The rear gear box represented is made of a conical torque device 17 mounted inside a casing 13 closed by a lid 14. The conical torque device 17 is made of the conical gear 20 and the conical ring 21. The conical gear 20 is mounted in a conventional way inside roller bearings on the main casing 15 of the casing 13. The conical ring 21 is mounted on the rear rotor shaft 18 arranged inside the main casing 15 and in the lid 14 via roller bearings.

According to the invention, the inlet 1 for air intake of the additional cooling system is located in the area of the ring 21 of the motion input conical torque device 17 and the outlet 2 for air exhaust is located beside the outlet of the rear rotor shaft 18, i.e. at the end of the main casing 15. The fresh air inlet duct 39 is located in the lid 14 and fitted with the valve 31 which is closed in normal operation and the outlet for air exhaust 2 is made by the outlet duct 40 which is fitted with the valve 41, closed in normal operation. This valve 41 has a constitution similar to those described previously, i.e. it contains a spring 43 bearing against a wall 42 in order to maintain the valve on its seat 44 which is fitted with an outlet hole 45.

Once the preset value threshold of the parameter significant for lubricating oil loss has been reached, the control device acts on the valve 31, in order to open it and to maintain it opened throughout the operation of the additional cooling system, whereas the air exhaust outlet valve 41 opens under the effect of the internal pressure.

Figure 5:
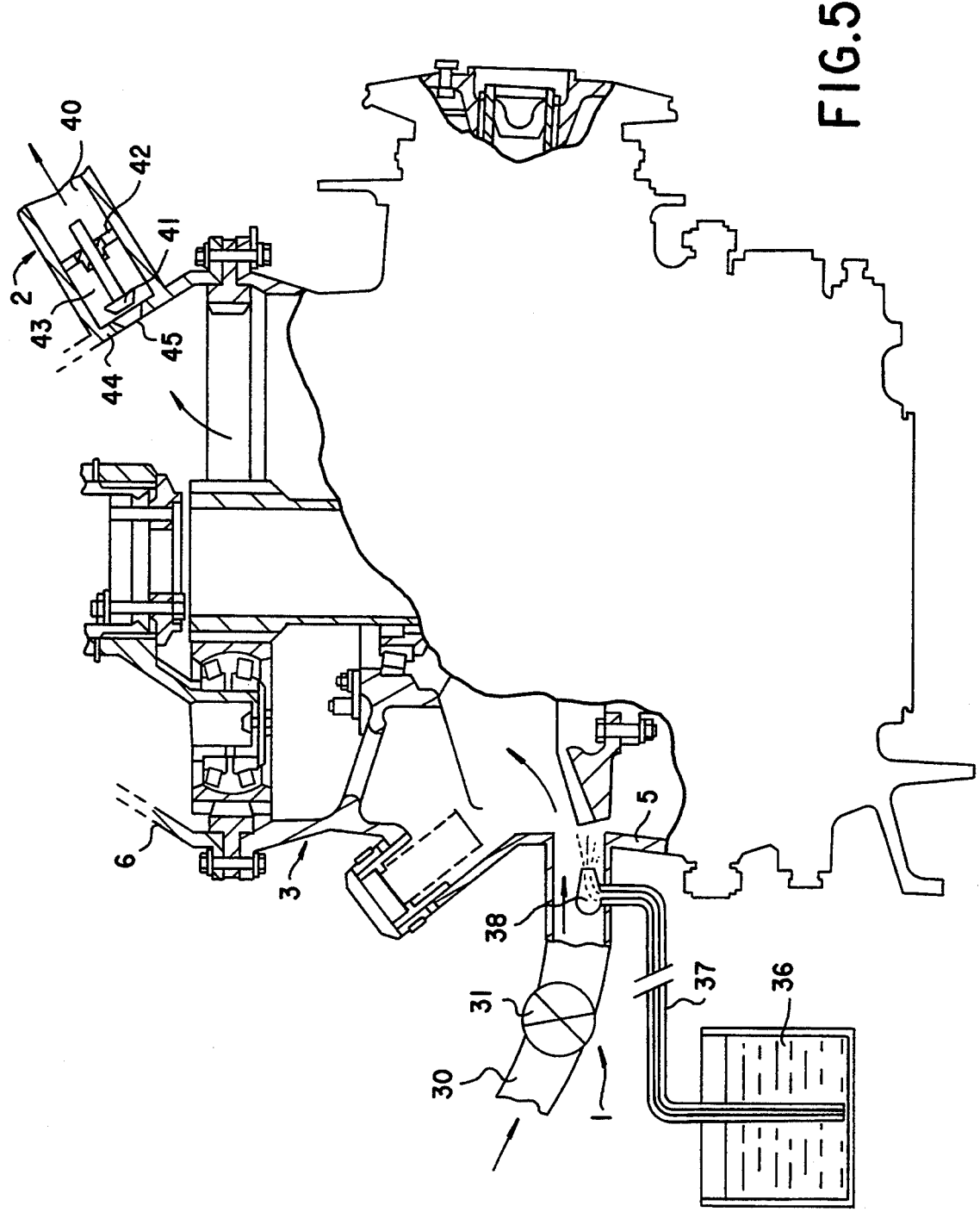
FIG. 5 is an axial view of a helicopter main gear, box assembly similar to FIG. 1, with another embodiment of the invention.

The device of the invention represented in FIG. 5 relates to a main gear box whose architecture is similar to that represented in FIG. 1. The additional cooling system, according to this embodiment, also contains an inlet 1 for air intake located in the area of the ring 11 of the motion input conical torque device 7 and an outlet 2 for air exhaust which is located in the area of the motion output epicycloidal train 9. The additional air circulation system contains a fresh air inlet duct 30 fitted with a valve 31 closed during normal operation. The outlet for air exhaust 2 is made of an outlet duct 40 fitted with a valve 41 closed during normal operation. In a similar way to the previous cases, the valve 41 contains a spring 43 which bears upon a wall 42, in order to press this valve 41 against its seat 44 fitted with an outlet hole 45.

Moreover, according to this embodiment of the invention, the additional cooling system comprises a supplementary emergency lubrication system using a liquid lubricant. One could also image another embodiment of the invention, which is not represented on figures, whereby this supplementary emergency lubrication system would use a solid lubricant. The supplementary emergency lubrication system, represented on FIG. 5, contains a lubricant reserve 36 outside the gear box. This reserve of lubricant 36 is connected to the duct 30 via a feeding pipe 37 leading immediately downstream the valve 31 of the fresh air inlet duct 30. The end 38 of this feeding pipe 37 is arranged as a Venturi configuration and it is arranged approximately in the centre of the inlet duct 30.

The reference signs inserted after the technical characteristics mentioned in the claims have the sole aim of facilitating the understanding of the former and do not limit the scope thereof in any way.

I claim:

1. Safeguard system of a speed increasing/reducing mechanical assembly in case of lubricating oil loss, characterized by the fact it contains an additional cooling system of the casing of said mechanical assembly, with an inlet and an outlet arranged on the casing of this mechanical assembly, which are closed during normal operation and that open under the action of a control device at a preset value of a parameter significant for the lubricating oil loss, this control device actuating simultaneously the additional cooling system in order to provide a circulation of the coolant between the inlet and the outlet, so that this coolant, loaded with the calories further to the warm-up caused by the lubricating oil loss, may evacuate the calories via the outlet of the additional cooling system.

2. Safeguard system according to claim 1, characterized by the fact that the additional cooling system of the casing comprises an air circulation system wherein air is said coolant.

3. Safeguard system according to claim 2, characterized by the fact that said mechanical assembly is a gear box containing a conical torque motion input device having a ring and an epicycloidal train motion output device, and the inlet of air intake is located in the area of the ring of the motion input conical torque device and the outlet for air exhaust is located in the area of the motion output epicycloidal train.

4. Safeguard system according to claim 2, characterized by the fact that said mechanical assembly is a gear box containing a conical torque device having a ring, and the inlet for air intake is located in the area of the ring of the motion input conical torque device and the outlet is located at the other end, axially.

5. Safeguard system according to claim 1, characterized by the fact that the additional cooling system further contains a supplementary emergency lubricating system.

6. Safeguard system according to claim 5, characterized by the fact that the supplementary emergency lubricating system uses a liquid lubricant.

7. Safeguard system according to claim 1, characterized by the fact that the control device is one of a manual or automatic control device.

8. Safeguard system according to claim 7, characterized by the fact that the control device is an automatic control device based on the measurement of the parameter significant for oil loss.

9. Safeguard system according to claim 7, characterized by the fact that the control device is an automatic control device based on the measurement of the parameter significant for temperature.

10. Safeguard system according to claim 2, characterized by the fact that said inlet of the air circulation system comprises a fresh air inlet duct fitted with an inlet valve closed in normal operation wherein the control device acts on said inlet valve at the threshold of the preset value of the parameter significant for lubricating oil loss, in order to open it and to maintain it opened throughout the operation of the additional cooling system, and said outlet comprises an outlet duct fitted with an outlet valve closed in normal operation, said outlet valve opening under the effect of internal pressure in the casing.

11. Safeguard system according to claim 10, characterized by the fact that the fresh air inlet duct is connected directly to the outside.

12. Safeguard system according to claim 10, characterized by the fact that the inlet duct is connected to a dynamic air tapping on the helicopter fuselage.

13. Safeguard system according to claim 10, characterized by the fact that the inlet duct further comprises a fan located immediately upstream the valve.

14. Safeguard system according to claim 10, characterized by the fact that the inlet duct further comprises a fan mounted immediately upstream of the inlet valve and a branch piping upstream of said fan in order to produce permanent water drainage for the inlet duct.

15. Safeguard system according to claim 10, characterized by the fact that the air inlet duct is connected to a compressor of an aircraft propeller unit turbine.

16. Safeguard system according to claim 5, characterized by the fact that the supplementary back-up lubricating system comprises a lubricant reserve outside the mechanical assembly and connected thereto by a feeding pipe leading immediately downstream of the inlet valve of the fresh air inlet duct, and the end of said feeding pipe is arranged as a Venturi, located approximately in the axial center of the inlet duct.

17. Safeguard system of a speed increasing/reducing mechanical assembly in case of lubricating oil loss comprising an additional cooling system connected to a casing of the mechanical assembly including normally closed inlet means for inletting additional coolant to the casing, normally closed outlet means for providing circulation of the coolant from said inlet means through the casing and for evacuating the coolant carrying excess heat caused by lubricating oil loss out of the casing, and control means for opening said inlet means and said outlet means at a preset value of a parameter significant for the lubricating oil loss.

18. Safeguard system according to claim 1 wherein said outlet is positioned vertically higher than said inlet.

* * * * *